Dec. 6, 1966   B. S. SAUTER   3,289,726
RETAINING DEVICE
Filed March 25, 1963   2 Sheets-Sheet 1
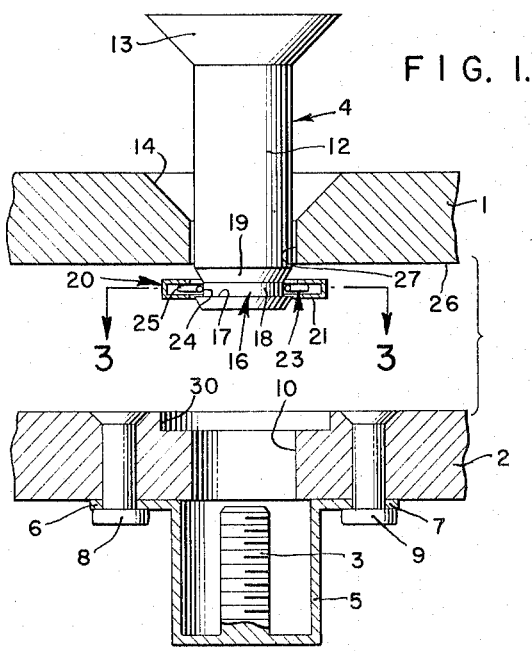
FIG. 1.
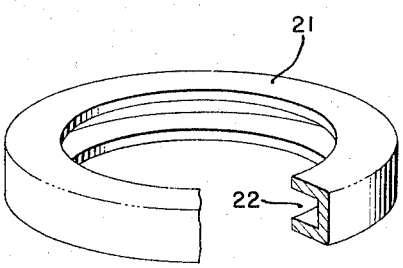
FIG. 4.
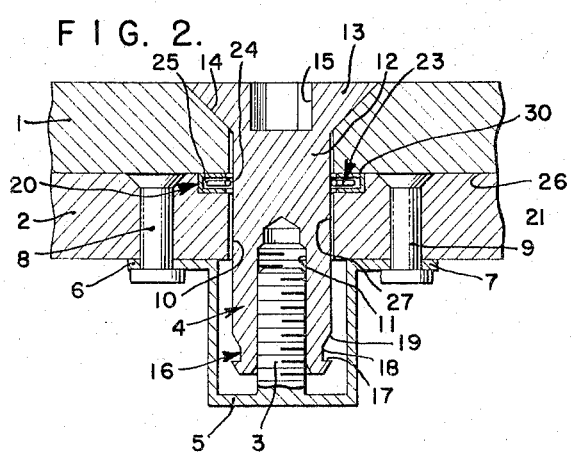
FIG. 2.
FIG. 3.
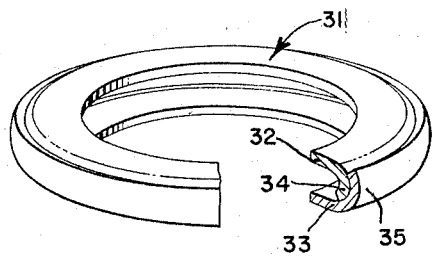
FIG. 5.
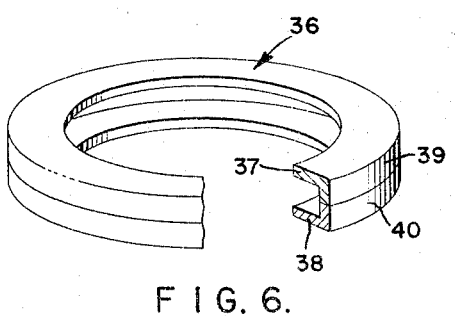
FIG. 6.
*INVENTOR.*
BOBBIE S. SAUTER
BY *Richard F. Carr*
ATTORNEY.

Dec. 6, 1966     B. S. SAUTER     3,289,726
RETAINING DEVICE
Filed March 25, 1963     2 Sheets-Sheet 2
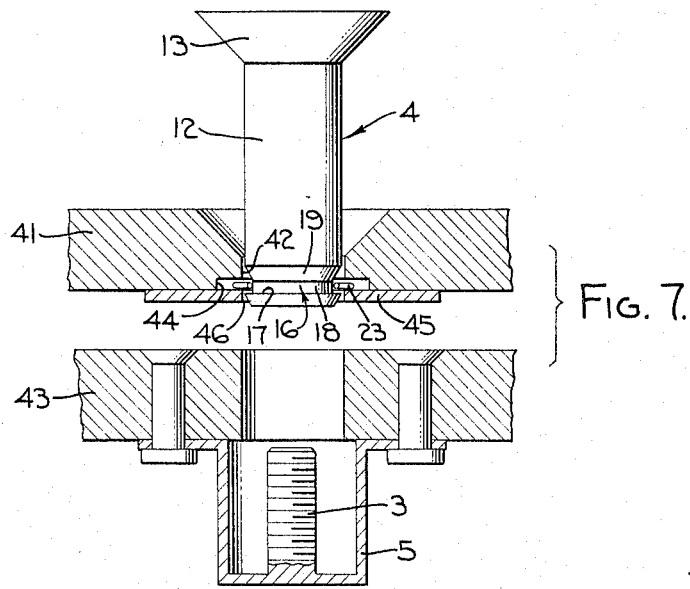
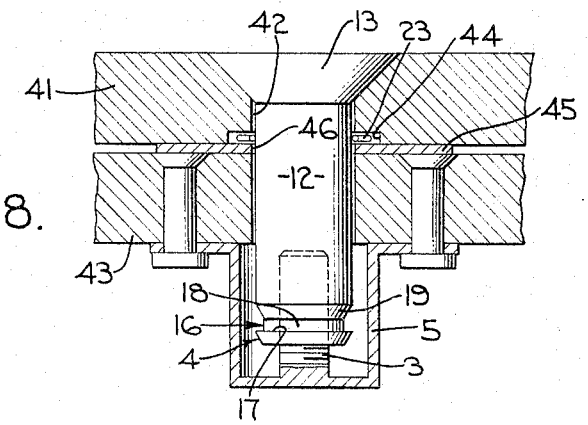
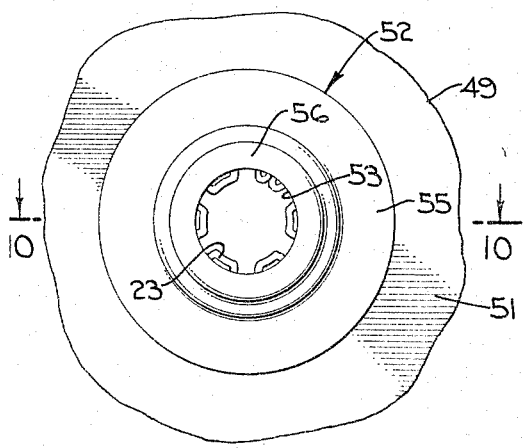
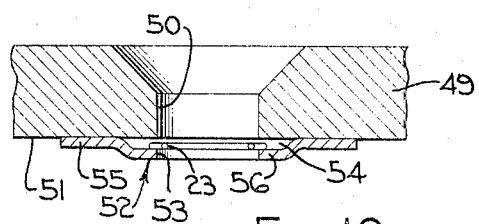
INVENTOR.
BOBBIE S. SAUTER
BY
ATTORNEY.

United States Patent Office 3,289,726
Patented Dec. 6, 1966

3,289,726
RETAINING DEVICE
Bobbie S. Sauter, Van Nuys, Calif., assignor to Deutsch Fastener Corp., Los Angeles, Calif., a corporation of California
Filed Mar. 25, 1963, Ser. No. 268,217
3 Claims. (Cl. 151—69)

This application is a continuation-in-part of my co-pending application for Retaining Device, Serial No. 4,411, filed January 25, 1960 and now abandoned.

This invention pertains to a device especially adapted to hold a loosened fastener to associated structure.

It is often desirable when removing an object such as a panel from its adjacent structure to retain the fasteners for the panel so that they will be instantly available for rapid reassembly. It has been known in the past that a split ring may be provided around the outside of the shank of each fastener, which member has a smaller free diameter than the diameter of the fastener. A groove may be included in the fastener to receive the split annular member when the fastener is loosened, and the combination of this groove and the annular member are intended to hold the fastener to the loosened part. However, to date, none of these devices has been particularly satisfactory because the rings are easily dislodged from their grooves so that fastener can become separated from its panel. At other times, the split rings may bind along the shank of the fastener so the fastener can not be readily tightened as desired. Sharp projections from these rings may cause scoring and thereby damage the fastener. Furthermore, a split ring permits only a relatively small amount of expansion without distortion. Often it is desirable for the shank of the fastener to have an end portion of considerably reduced diameter to allow assembly with the mating portion of the fastener even where there is misalignment between the parts. Such a narrow shank end necessitates a groove having a much smaller diameter than the maximum dimension of the shank. Conventional split ring retainers cannot be used satisfactorily for such installations because they will become permanently distorted when expanded from the groove diameter to the extreme size of the shank.

The present invention provides a retaining device which includes an annular retainer C-shaped in cross section having an open side toward the shank of the fastener. A spring member is received within the annular opening and extends inwardly therefrom to be received in a groove in the fastener shank. When the fastener is secured, the ring is forced further into the annular member as it is shifted out of the groove. The retainer may be either a separate element or secured permanently to the workpiece. This construction effectively realizes the object of this invention noted below.

It is an object of this invention to provide a retaining device for a fastener, which device will not become displaced inadvertently from the fastener once it is received thereon.

Another object of this invention is to provide a retaining device which will not bind on the surface of the fastener and which will not scratch or otherwise damage this surface.

An additional object of this invention is to provide a retaining device for a fastener, which device is capable of a large amount of expansion.

A further object of this invention is to provide a retaining device which is light in weight, easy to install and economical to construct.

Yet another object of this invention is to provide a retainer for one section of a separable fastener which can hold the fastener section above the workpiece when the fastener is separated.

These and other objects will become apparent from the following detailed description taken in connection with the accompanying drawing in which:

FIG. 1 is a sectional view of the retainer of this invention associated with a fastener in the separated position, FIG. 2 is a sectional view, similar to FIG. 1, but with the elements of the fastener secured together, FIG. 3 is a transverse sectional view taken along line 3—3 of FIG. 1 showing the spring member within the groove in the fastener, FIG. 4 is a perspective view of the receptacle member of the invention, FIG. 5 is a perspective view of a modified form of receptacle member, FIG. 6 is a perspective view of a further modification of the receptacle member, FIG. 7 is a longitudinal sectional view of a modified form of the retainer associated with a separated fastener and maintaining one section of the fastener in an elevated position, FIG. 8 is a sectional view similar to FIG. 7, but with the fastener elements in the secured position, FIG. 9 is an end elevational view of a different form of the retainer, operable similarly to the version of FIGS. 7 and 8, and FIG. 10 is a transverse sectional view taken along line 10—10 of FIG. 9.

With reference to the drawing, a typical fastener assembly which may utilize the teachings of this invention may be seen in FIGS. 1 and 2. It should be understood that the particular fastener is illustrative only, and the invention may be used with other fasteners of different appearance. By the arrangement shown, members 1 and 2, which may comprise panels or other elements, are to be secured together by a fastener which includes a stud or bolt 3 and a nut 4. Stud 3 is secured to the bottom wall of a cage 5 having outwardly projecting flanges 6 and 7 which receive rivets 8 and 9 that secure the cage to member 2. This positions stud 3 adjacent opening 10 through member 2, substantially at its axis.

Nut 4 is provided with a threaded aperture 11 at the end of shank 12 for receiving stud 3. For flush installations, head 13 of the nut is frusto-conical in shape and adapted to be received in countersunk portion 14 of member 1 when the device is assembled. A driving recess 15 is provided in the upper central portion of head 13.

A groove 16 is provided in the bottom end portion of shank 12 of nut 4, this being arranged annularly and continuously around the periphery of the nut. This groove includes a lower radial wall portion 17, a central cylindrical wall portion 18 and an upper inclined wall portion 19. The retainer assembly 20 of this invention is adapted for association with the nut member within this groove when the fastener is in the loosened position of FIG. 1 thereby retaining nut 4 to member 1.

The retaining member 20 of this invention includes a receptacle portion 21 which is in the form of a continuous ring having a substantially C-shaped cross section. The open side 22 of this receptacle member is along the inner circumference adjacent the shank 12 of nut member 4.

Received within the receptacle member is a light wire spring 23. This member is of split annular construction, and given an undulating form as illustrated. In its free diameter, the inner edge portions 24 thereof project inwardly beyond the inner edge of receptacle 21, while the outer portions 25 remain within the receptacle.

Therefore, when the nut 4 is separated from the stud 3, and in the raised position of FIG. 1, inner edge portions 24 of the spring member 23 extend inwardly into groove 16, engaging inner cylindrical wall 17 thereof (see FIG. 3). The outer edge portions 25 of the retainer spring are disposed within the receptacle 21, which in turn projects beneath the bottom surface 26 of member 1, extending outwardly beyond opening 27 therethrough. This means that when the fastener is loosened, as in FIG. 1, the nut portion cannot be separated from member 1. Movement in the upper direction is precluded by the engagement of spring 23 with radial wall 17 of the groove, and by the engagement of the outer face of the receptacle member with the under surface 26 of member 1. With the retainer spring partially received in the receptacle, as well as being received in the annular groove on the shank of the nut, the spring is prevented from distortion and bending, and is firmly held on the shank of the fastener. Impact loads and vibrational forces may be absorbed by the spring secured by the receptacle 21 without causing the retainer assembly 20 to be dislodged from the end of the fastener member.

When the fastener is to be assembled, nut 4 simply is moved downwardly to engage stud 3 and is threadably received thereon. This easily forces spring wire member 23 outwardly into the receptacle member 21 which has an inner diameter greater than the outer diameter of the shank of the fastener. This position of spring 23 may be seen in phantom in FIG. 3. Thus, the only force resisting the axial movement of the nut comes from the spring member itself and not from the receptacle. The light wire spring readily slides up inclined surface 19 of the groove to then engage the periphery of the shank 12 of the nut. The use of a spring wire member 23 allows a large amount of expansion for the retainer member. Even where the diameter of shank 12 is much greater than that of groove 16, spring member 23 will slide from the groove to the shank without being given any permanent distortion.

A recess 30 may be provided in member 2 which receives the retainer member when the fastener is secured. Thus, as the fastener is assembled, the retainer member is moved relative to the shank 12 without difficuty or damage to the fastener until it enters opening 30 where it remains until the fastener again is loosened.

Variations are possible in the construction of the receptacle member in order to obtain a device having extremely low cost as well as great reliability. Instead of the configuration of FIGS. 1 through 4, which is primarily adapted for a machining operation, the construction of FIG. 5 may be resorted to. Here the receptacle member 31 is comprised of a duality of segments 32 and 33, the end wall portions of which are bent over each other in forming the assembled receptacle. Preferably, outer wall 34 of portion 32 is given a slight curvature as shown, so that when wall 35 of member 33 is complementarily bent over this wall it cannot be displaced outwardly, and the two halves of the unit will be secured together. One particular advantage of this arrangement is that the spring member may be associated with portion 32 of the unit prior to assembling the second portion 33 thereon. Thus, it is not necessary to distort the spring wire member in inserting it into the receptacle, which is especially helpful for mass production of the units.

Another two-piece construction may be seen in FIG. 6 where the retainer 36 is made of two segments 37 and 38 which are welded, brazed, soldered or otherwise suitably fastened together. This may be along a circumference where the outer walls 39 and 40 meet. Alternatively, an outer circumferential wall may be provided on only one of the members and the second may be in the form of a flat annular disc attached thereto.

The detaining device of this invention may be incorporated as an integral part of the workpiece when constructed as illustrated in FIGS. 7 and 8. The workpiece 41 shown may comprise one of the parts to be secured, similar to the panel 1, being provided with an opening 42 through which the shank 12 of the nut 4 extends. The cage 5 is carried by the second workpiece 43, positioning the stud 3 for engagement by the nut 4.

On the bottom surface of the workpiece 41 with which the nut 4 is associated there is annular groove 44. This recess extends radially outward from the lower end of the opening 42 with which it is coaxial. A flat plate 45 is positioned over the bottom end of the recess 44, and includes a clearance opening 46 through which the shank 12 of the nut 4 can pass freely. The sheet 45 may be secured to the member 41 in any suitable manner, such as by means of small rivets, spot welding or it may be bonded to the lower surface of the member 41. This plate may be a relatively thin piece of sheet steel, typically being .016 inch thick. When a plurality of fasteners are included for the workpiece 41, the sheet 45 may be in the form of a continuous strip extending from one fastener opening to the next.

The combination of the recess 44 and the overhanging portions of the plate 45 adjacent the recess defines an annular receptacle into which the undulant wire spring member 23 can be fitted. Thus, there is provided a retainer for the spring corresponding in dimension generally to the receptacles 21, 31, and 36 previously described.

The operation of the device is the same as before, insofar as the action of the undulant spring is concerned in its relationship to the nut 4. The spring can move relative to the shank 12 of the nut, and enter the groove 16 to hold the nut to the workpiece. However, the retainer no longer is a separate member but is attached permanently to the workpiece.

One of the principal advantages of this arrangement lies in the fact that it enables the nut 4 to be held in a position where it projects well above the outer surface of the member with which it is associated. When the nut and stud are separated as seen in FIG. 7 the spring 23 and plate 45 cooperate to hold the head 13 of the nut spaced outwardly from the upper surface of the panel 42.

This, of course, is not true in the embodiment of FIG. 1 where the nut can drop down so that the head 13 is received in the countersink provided for it. This can give the illusion from the outside that the fastener is secured when in reality such is not the case. By keeping the spring 23 adjacent the undersurface of the workpiece, however, the nut will be maintained above the outside of the work whenever the fastener is loosened. Backing the nut off the stud 3 automatically raises the nut, while the axially fixed retainer spring holds the nut in the elevated position. This results in an important safety feature, guarding against the inadvertent failure to secure the panel 41 when it is to be attached subsequently.

Another version of the permanent attachment of the retainer to the workpiece is shown in FIGS. 9 and 10. This embodiment avoids the formation of the recess 44 in the member with which the nut is associated. This is of particular significance where the workpiece may be a relatively thin panel. A recess normally will be necessary in the second workpiece when the retainer is constructed in accordance with this embodiment. The advantages of the complete retraction of the fastener and the holding of the fastener in such position are retained.

As seen in FIGS. 9 and 10, workpiece 49 includes the usual opening 50 to receive the fastener member. Member 49 may have a completely smooth lower surface 51 to which is attached a sheet metal retainer 52. The member 52 includes an opening 53 through which the shank of the fastener may pass. The retainer is made somewhat dome-shaped so that together with the lower surface 51 of the workpiece 49 there is defined a receptacle 54 adapted to receive the split wire spring element 23. This is accomplished by the formation of outer flange portions 55 on the sheet member 52 which are attached to the surface 51 of the panel 49. The central part 56 is spaced outwardly from surface 51 so that the annular recess 54 is formed. Hence, the spring is retained in an annular groove similar to that provided with the other embodiments of the invention. Moreover, the separated portion of the fastener can be held in the fully retracted position as in the arrangement of FIGS. 7 and 8.

Regardless of which variation of the receptacle is employed, the device of the invention will always provide a unit which is reliable in operation by being extremely difficult to become displaced from the shank of the fastener, yet which will cause no damage to this member, will not bind thereon, which allows a great deal of expansion and which is axially movable by a minimum of force.

The foregoing detailed description is to be clearly understood as given by way of illustration and example only, the spirit and scope of this invention being limited solely by the appended claims.

I claim:
1. In combination with a threaded fastener having a nut portion and a bolt portion, one of said portions being provided with an elongated shank and provided with a head at one end of said shank, said shank having an annular groove at the opposite end thereof, the end of said groove adjacent said head being outwardly flaring toward said head, the opposite end of said groove having an abutment shoulder, a retaining device for preventing separation of said shank from a workpiece comprising
   an annular member
      having an outer circumferential wall,
      and a pair of spaced parallel radial annular flanges at the ends of said wall,
         said flanges having an inside diameter greater than the outside diameter of said shank, and smaller than the outside diameter of said head,
   and a resilient member associated with said annular member,
      said resilient member being of split annular construction and formed of resilient spring wire of undulating contour to present inner portions adjacent said shank and outer portions in said receptacle intermediate said flanges,
      said resilient member being resiliently biased inwardly,
         whereby said resilient member is adapted to enter said groove for preventing separation of said shank from a workpiece,
      the undulations of said resilient member being proportioned so that when said inner portions of said resilient member are in said groove, outer portions of said resilient member are in said receptacle intermediate said flanges,
   said resilient member being radially expansible upon axial movement of said member relative to said shank toward said head along said outwardly flaring end of said groove
      and dimensioned to be substantially entirely received within said receptacle when so expanded, whereby said retaining device is axially slidable relative to said shank.

2. A device as recited in claim 1 in which
   said flanges are axially aligned
   and have substantially the same inside diameter.

3. In combination with a fastener having a threaded bolt portion, and a nut having a threaded aperture therein for threadably receiving said bolt portion, said nut having an elongated cylindrical shank, and a head at one end of said shank, said shank having an annular groove at the opposite end portion thereof, said groove having an end wall adjacent said head tapering outwardly toward said head, and an end wall remote from said head presenting an abutment shoulder, a workpiece having an aperture therethrough dimensioned to receive said shank when said nut is to be engaged with said bolt, said workpiece having a relatively short cylindrical recess concentric with and of larger diameter than said aperture in said workpiece, a retainer for precluding separation of said nut from a workpiece comprising
   an annular receptacle having a circumferential outer wall and a pair of radial flanges at either end of said circumferential wall,
      both of said flanges having substantially the same inside diameter,
      said inside diameter being larger than the outside diameter of said shank,
      and smaller than the outside diameter of said head,
      said receptacle being axially and radially dimensioned to fit entirely within said recess in said workpiece,
   and a split annular wire spring in said receptacle,
      said wire spring having an undulating contour providing inner portions and outer portions,
      said wire spring being inwardly biased whereby inner portions are adapted to enter said groove and precluded from separating from said groove toward said opposite end by engagement with said abutment shoulder of said groove,
      said wire spring being radially expansible in response to axial movement away from said opposite end along said tapering wall of said groove,
      and dimensioned to be substantially entirely received within said receptacle when so radially expanded,
         whereby said retainer is axially slidable along said cylindrical shank with said inner portions of said resilient member in engagement with the periphery of said shank.

References Cited by the Examiner

UNITED STATES PATENTS

| 581,392 | 4/1897 | Dowse | 24—218 |
|---|---|---|---|
| 1,879,100 | 9/1932 | Colby | 24—218 |
| 2,991,816 | 7/1961 | Harbison | 151—69 |
| 3,217,774 | 11/1965 | Pelochino | 151—69 |

FOREIGN PATENTS

| 807,871 | 7/1951 | Germany. |
|---|---|---|
| 1,061,547 | 7/1959 | Germany. |
| 596,697 | 1/1948 | Great Britain. |

CARL W. TOMLIN, *Primary Examiner.*

EDWARD C. ALLEN, *Examiner.*

C. B. ELDERKIN, M. PARSONS, *Assistant Examiners.*